United States Patent [19]
Epworth

[11] Patent Number: 5,513,030
[45] Date of Patent: Apr. 30, 1996

[54] OPTICAL PULSE RETIMING AND RESHAPING CIRCUIT

[75] Inventor: Richard E. Epworth, Sawbridgeworth, United Kingdom

[73] Assignee: Northern Telecom Limited, Quebec, Canada

[21] Appl. No.: 133,446

[22] Filed: Oct. 7, 1993

[30]     Foreign Application Priority Data

Dec. 23, 1992 [GB] United Kingdom ............... 9226767

[51] Int. Cl.$^6$ ....................................... H04B 10/04
[52] U.S. Cl. .................. 359/187; 359/162; 359/174
[58] Field of Search ..................... 359/134, 154, 359/158, 160–162, 174, 187, 181–184, 239; 385/1–2, 5, 8–9; 375/111, 120

[56]     References Cited

U.S. PATENT DOCUMENTS

| | | | |
|---|---|---|---|
| 4,805,235 | 2/1989 | Henmi | 359/187 |
| 5,170,274 | 12/1992 | Kuwata et al. | 359/183 |

*Primary Examiner*—Leo Boudreau
*Assistant Examiner*—Kinfe-Michael Negash
*Attorney, Agent, or Firm*—Lee, Mann, Smith, McWilliams, Sweeney & Ohlson

[57]            ABSTRACT

An optical pulse retiming and reshaping circuit for soliton transmission in a transmission system with distributed amplifiers transmits the pulses through an optical modulator, uses a slow photodiode to determine the mean power transmitted (or intercepted) by the modulator. This is used for generating a control signal for use in a phase-locked loop to regulate the phase of an oscillator driving the modulator.

20 Claims, 4 Drawing Sheets

OPTICAL PULSE RETIMING AND RESHAPING CIRCUIT

BACKGROUND TO THE INVENTION

This invention relates to optical pulse retiming and reshaping circuits, and finds particular, but not necessarily exclusive, application in the retiming of soliton pulses in long distance optical fibre data transmission systems in order to assist in overcoming the noise, inter-pulse interference, and the Gordon-Haus limitation introduced by the presence of concatenated optical amplifiers along the transmission path.

A paper by M. Nakazawa et al, entitled "10 Gbit/s Soliton Data Transmission over One Million Kilometers", Electronics Letters 4th July 1991 Vol. 27 No. 14, pages 1270–1272, discloses how a lithium niobate Mach Zehnder optical modulator can be used to assist in overcoming the Gordon-Haus limitation. In the experimental set-up described by those authors in the paper the solitons are recirculated in a 510 km long loop to synthesise the 106 km transmission path, and hence a single optical modulator used for pulse retiming and reshaping could obtain its drive signal via an electrical transmission path from a central clock, which was also used to generate the timing and shaping of the initially transmitted soliton pulse stream. In contrast, in a real long distance optical fibre transmission system it will normally be necessary to extract a local clock signal from the data stream at each pulse retiming and reshaping modulator location. The paper does not specify in detail, how this clock extraction can be effected, but merely states that it can be effected using a narrowband SAW filter. In the electrical regime clock extraction is conventionally achieved by tapping off some of the input data stream (electrical) pulses, amplifying the tapped-off signal, passing it through a high Q filter.

Such a clock extraction technique can be applied with minor modification as depicted in FIG. 1 for the extraction of an electrical clock signal from an optical data stream. FIG. 1 depicts an optical pulse retiming and reshaping circuit for inclusion in an optical data transmission system. Referring to FIG. 1, an optical modulator 10 is inserted into an optical data transmission line 11 for the transmission of return to zero (RZ) data pulses, typically soliton pulses. Just upstream of the modulator 10 is an optical tap 12 feeding a high speed photodiode 13. The output of this photodiode is fed via a high speed amplifier 14 to a high Q filter 15, typically a SAW filter, tuned to the frequency of the clock component of the data stream, to produce, at the output of the filter 15, an extracted clock signal. The clock signal is applied to a power amplifier 16 to amplify it sufficiently for use in driving the modulator 10. In FIG. 2 an illustrative short portion of a soliton pulse data stream which is applied to the input of the modulator is depicted by trace 20. The pulses of this portion are in need of retiming and reshaping. In particular the trace shows the optical amplitude as not returning to zero between the more closely spaced pair of soliton pulses. Trace 21 depicts the attenuation characteristic of the modulator 10 expressed as a function of time, this characteristic varying sinusoidally at the clock frequency between a substantially zero attenuation minimum and a high attenuation maximum. Trace 22 depicts the resulting retimed and reshaped portion of the soliton pulse data stream immediately after its passage through the modulator 10.

The optical pulse retiming and reshaping circuit of FIG. 1, though it uses high frequency electronics, is a much more simple device to implement than a full regenerator. A full regenerator has to handle broadband data as well as extract a clock signal, whereas in this circuit of FIG. 1 the only electrical signal is a narrow bandwidth clock signal. Narrow bandwidth external modulators are very much easier to make and drive, and the power requirements are much smaller than those of a full regenerator, being very little more than those of an amplifier alone.

SUMMARY OF THE INVENTION

The present invention offers an alternative way of driving a modulator for pulse retiming and reshaping, one that involves the use of fewer components required to operate at the high frequency of the bit rate.

According to the present invention there is provided an optical pulse retiming and reshaping circuit having an optical modulator driven by an oscillator having a phase control input connected in a phase-locked loop having a phase/frequency control signal input connected to receive a signal derived from means providing a measure of the mean optical power transmitted by, or intercepted by, the modulator.

Such pulse retiming and reshaping circuits may be included in an optical transmission path with distributed optical amplifiers at the locations of selected ones of those amplifiers so that the data stream is amplified several times over between consecutive retiming and reshaping of its pulses, or one of such circuits can be included at each such amplifier so that the pulses are retimed and reshaped each time they are amplified.

BRIEF DESCRIPTION OF THE DRAWINGS

There follows a description of optical pulse retiming and reshaping circuits embodying the invention in preferred forms. The description refers to the accompanying drawings, in which.

DETAILED DESCRIPTION OF PREFERRED EMBODIMENTS

Figure 1:
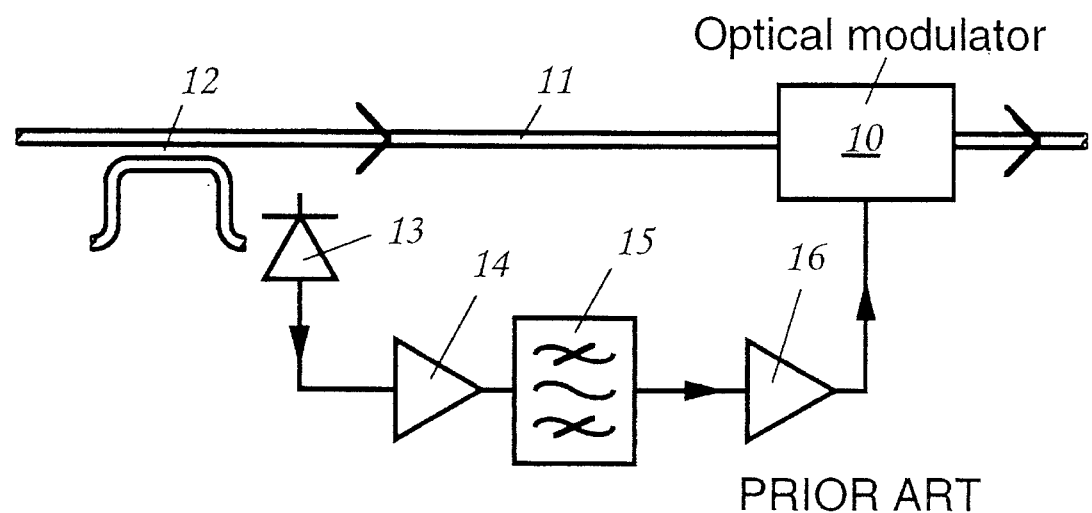
FIG. 1 (to which previous reference has already been made) depicts an optical pulse retiming and reshaping circuit that does not embody the present invention (but is provided for the purposes of comparison), FIG. 2 (to which previous reference has also been made) depicts, as a function of time, the optical amplitude of a portion of an illustrative data pulse train before retiming and reshaping, the attenuation characteristic of the modulator of FIG. 1, and the portion of the sample data pulse train after retiming and reshaping by its passage through the modulator of FIG. 1, FIGS. 3, 4 and 5 depict optical pulse retiming and reshaping circuits embodying the present invention in preferred forms.
Figure 2:
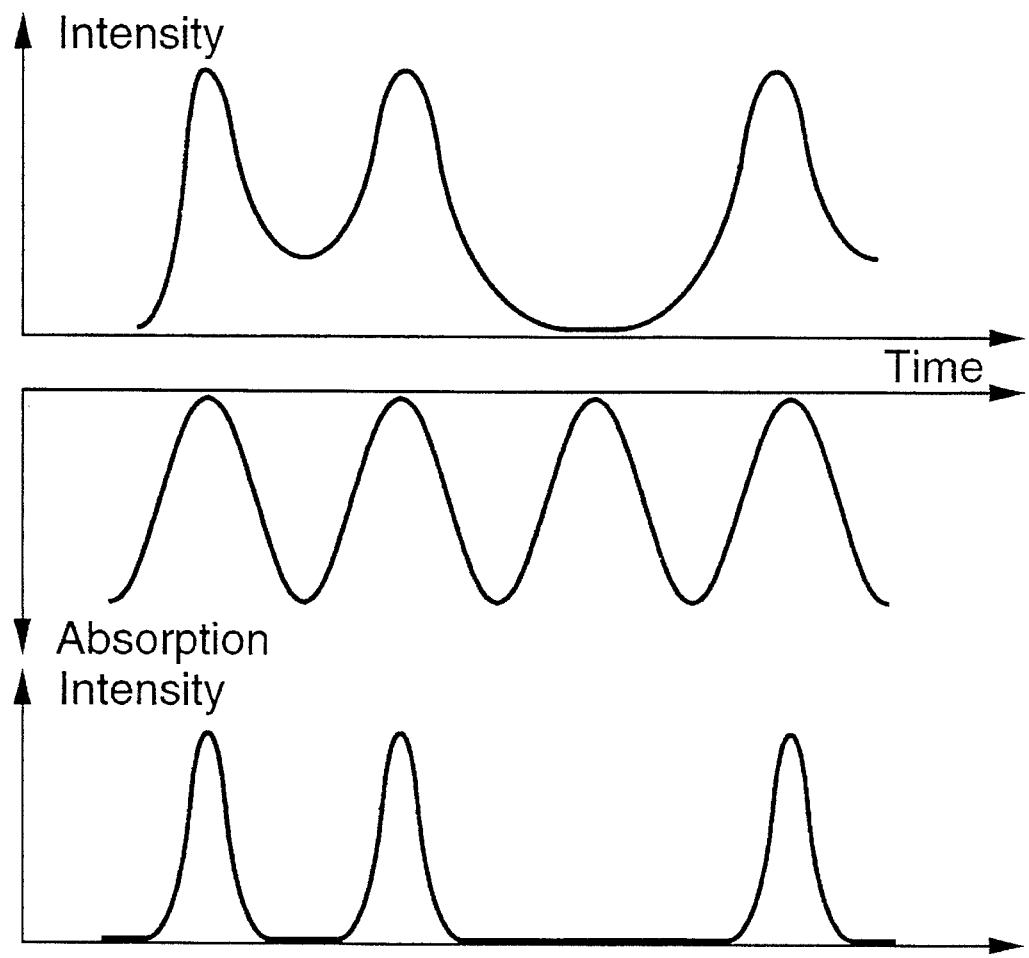
Figure 3:
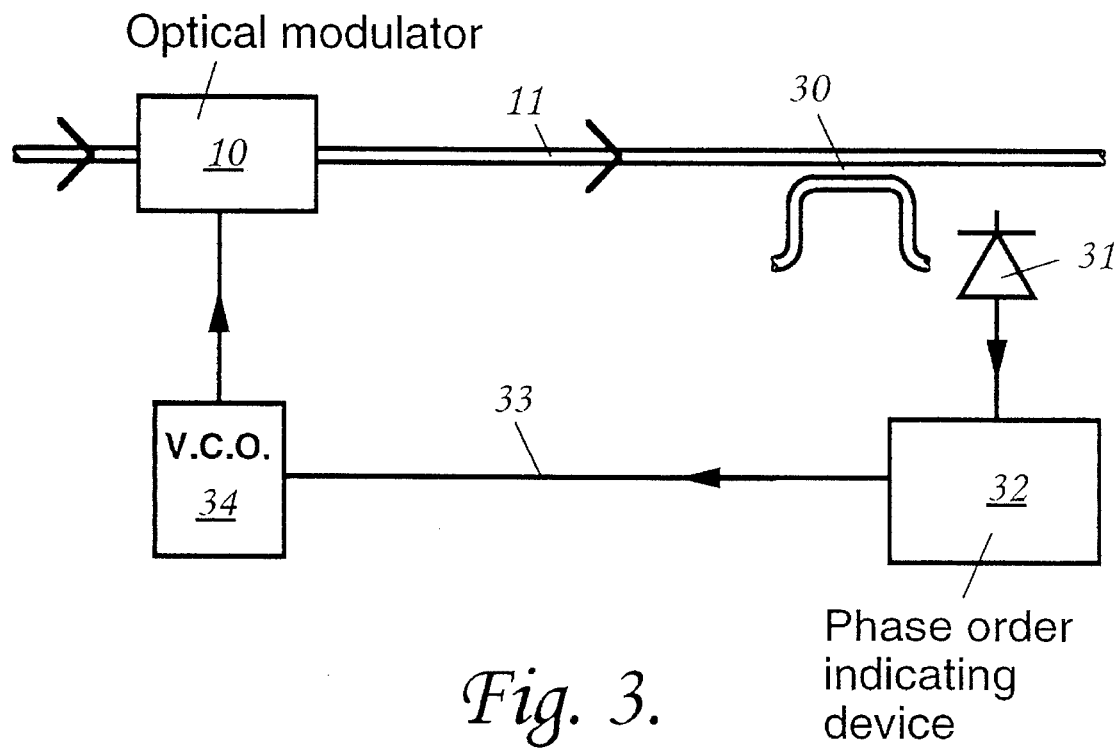

Referring now to FIG. 3, an optical pulse retiming and reshaping circuit which embodies the present invention in a preferred form has, like the circuit of FIG. 1, an optical modulator 10 inserted into an optical transmission line 11, and similarly has an optical tap, but in this instance the optical tap 30 is located downstream of the modulator instead of upstream of it. The optical tap similarly feeds a photodiode 31, but in this instance the photodiode 31 is a slow speed one, rather than a high speed one, because it is not required to resolve individual pulses of the data stream, but instead is intended to provide an electrical output which is a measure of the mean optical power output of the modulator 10. For instance by reference to FIG. 2, it can readily be seen that this mean optical power output is at a maximum whenever the modulator is being modulated in phase with the clock component of the data stream. Accordingly the output of the photodetector 31 is applied via a phase order indicating device 32 to the voltage control input 33 of a voltage controlled oscillator (VCO) 34 that drives the modulator 10. In this way a phase-locked loop is formed which applies a signal to the voltage control input 33 of the VCO 34 so as to regulate its phase in such a way that the modulation applied by the modulator 10 to the optical data stream on transmission line 11 is maintained in phase synchronism with the clock component of that data stream.

Figure 4:
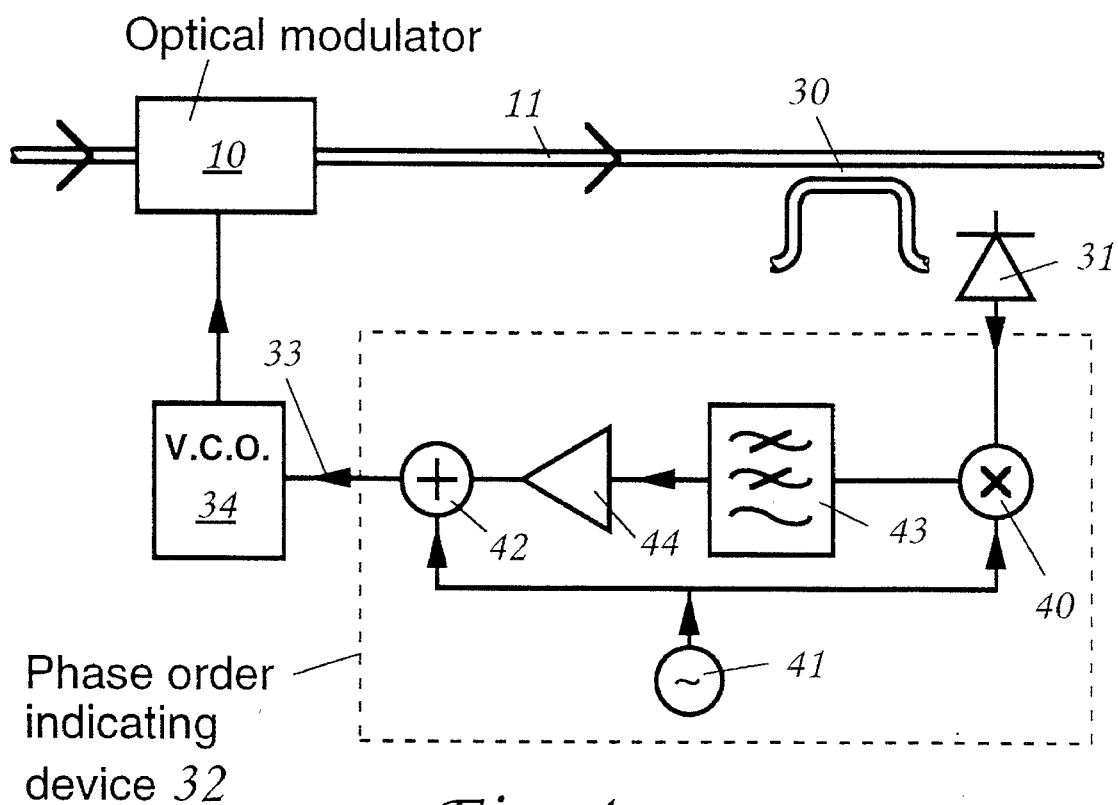

A convenient way of implementing the phase-locked loop system of FIG. 3 is illustrated in the optical pulse retiming and reshaping circuit of FIG. 4. The output of the photodiode 31 is fed to one input of a multiplier (synchronous detector) 40 whose other input is taken from the output of a low frequency dither oscillator 41. An output of the low frequency dither oscillator 41 is also applied, via an adder 42, to the phase/frequency control input line 33 of the voltage controlled oscillator 34. The small amount of dither voltage supplied by the dither oscillator 41 to the voltage controlled oscillator 34 imparts a dither to the phase of the clock signal that is supplied by the voltage controlled oscillator 34 to drive the modulator 10. This produces a fluctuation in the mean optical power transmitted by the modulation, this mean power being reduced each time the phase moves out of synchronism with the clock component of the data stream, whether to be ahead of synchronism or behind it. This fluctuation is monitored by the photodiode 31, and its output is multiplied in the synchronous detector 40 by the output of the dither oscillator 41 to produce a resultant signal which changes sign as the phase of the voltage controlled oscillator generated clock passes through synchronism with the data stream. This resultant signal may be passed through a low-pass filter 43 and an amplifier 44 to provide a signal of suitable magnitude for application to the other input of the adder 42.

Figure 6:
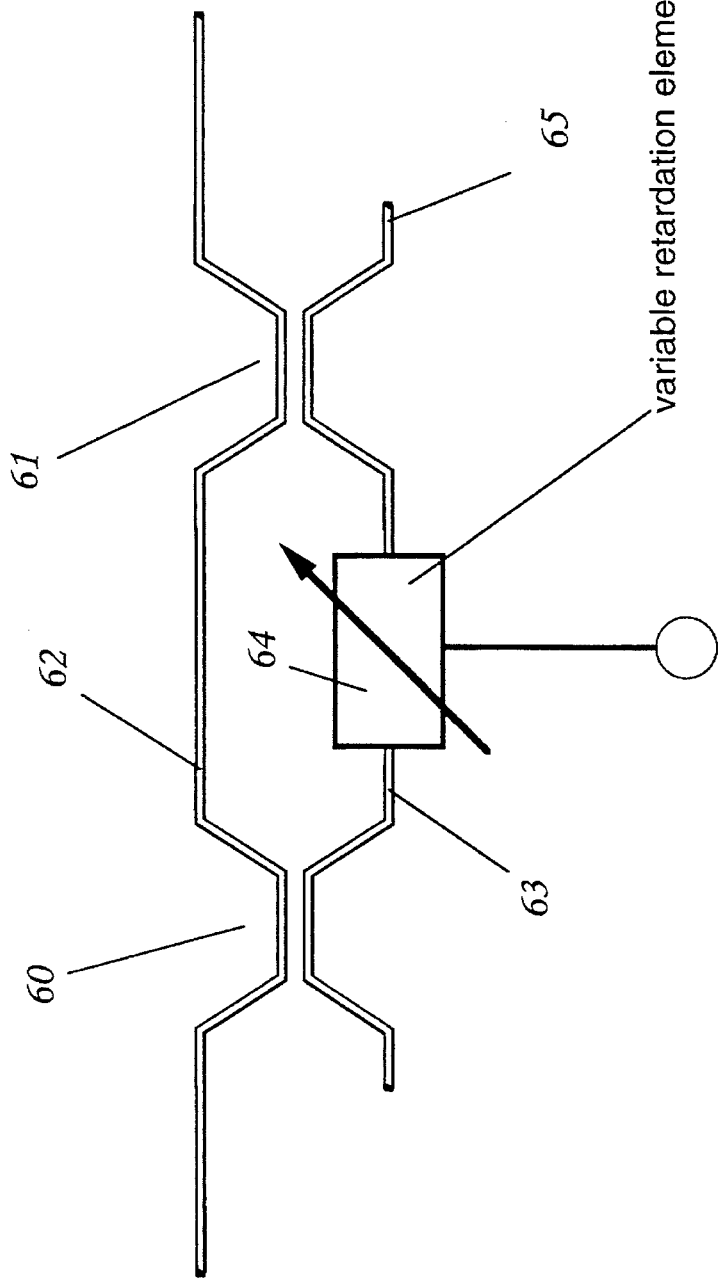
FIG. 6 is a diagram of a Mach Zehnder type modulator for use in the circuit of FIG. 3.

The optical pulse retiming and reshaping circuits of FIGS. 3 and 4 both involve the use of an optical tap located downstream of the modulator, but in some circumstances this tap may be integrated with the modulator itself. Thus, if the modulator is of the Mach-Zehnder type, for instance as schematically depicted in FIG. 6, and comprising a pair of 3 dB couplers 60, 61 connected optically in series so as to define the two limbs 62, 63 of the Mach-Zehnder, one of which incorporates a variable retardation element 64 such as a lithium niobate crystal, the unused output port 65 of the second 3 dB coupler of the Mach-Zehnder can be brought into service to act as the optical tap. Whereas the optical tap of the circuits of FIGS. 3 and 4 provides a signal that varies in proportion with the signal transmitted by the modulator, in this instance the signal in the tap varies in an inverse functional manner because it is receiving the power intercepted (not transmitted) by the modulator. Accordingly the connections in the phase-locked loop will need to be modified to take account of this difference, so that it operates to minimise tapped power instead of to maximise it.

Figure 5:
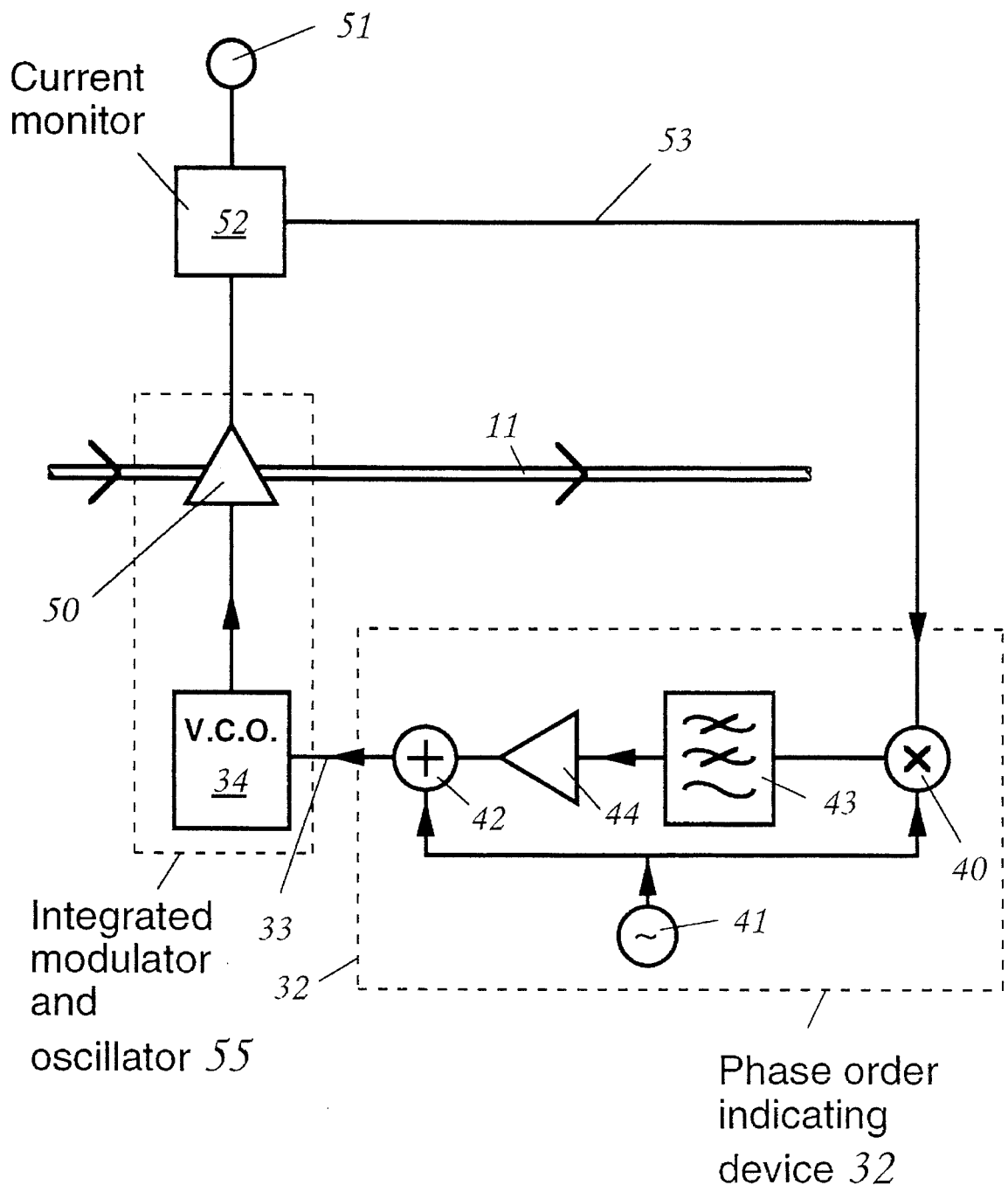

Comparing the optical pulse retiming and reshaping circuits of FIGS. 3 and 4 with that of FIG. 1, it is seen that in the circuit of FIG. 1 it is necessary to ensure that the correct differential path length between the path taken by the data stream from the tap 12 to the modulator and that taken by the extracted clock signal, is provided such as to produce the required phase synchronism at the modulator, whereas in the circuits of FIGS. 3 and 4 no corresponding path length adjustment is required. Each of the circuits of FIGS. 1, 3 and 4 incorporates a modulator 10 which is a high frequency component capable of operating at the frequency of the clock component of the data stream. The circuit of FIG. 1 has four further high frequency components, namely the photodiode 13, the amplifier 14, the filter 15, and the driver 16, whereas the circuits of FIGS. 3 and 4 each has only one further high frequency component, namely the oscillator 34. This oscillator may be included in the modulator package, thereby eliminating any need for any high frequency connections to be made with that package. In some instances the oscillator can be incorporated with the modulator so that the self-capacitance of the modulator can form part of the resonant circuit of the oscillator, and in this way advantage can be taken of the voltage multiplication provided by the Q of the resonant circuit to produce adequate optical modulation depth with a relatively small oscillator rail voltage. The optical pulse retiming and reshaping circuits of FIGS. 3 and 4 use an optical tap 30 to tap off some of the optical output of the modulator for feeding to a photodetector 31 in order to provide an electrical signal representative of the mean optical power output of the modulator. The circuit of FIG. 5 shows how the need for the tap and photodetector can be dispensed with when the modulator 10 is an electro-absorption modulator, for instance a multi-quantum well (MQW) electro-absorption modulator diode. Referring to FIG. 5, an MQW electro-absorption modulator diode 50 is inserted into the optical transmission line 11. Bias for this modulator 50 is provided from a voltage bias source 51, and additionally the voltage developed across the modulator is modulated by a voltage controlled oscillator 34. Also included in the bias circuit of the modulator 50 is a current monitor 52 which provides an output signal on line 53 which is proportional to the mean bias current flowing through the modulator 50, and hence is also representative of the mean absorbed optical power absorbed by the modulator mean intercepted power. This output on line 53 therefore corresponds to the output from the photodiode 31 of FIGS. 3 and 4, and hence is similarly applied via a phase order indicating device 32 to the voltage control input 33 of the voltage controlled oscillator 34.

In this instance also, there can be advantage in making the modulator 50 part of the resonant circuit of the oscillator 34 so as to take advantage of the voltage multiplication factor afforded by the Q of the resonant circuit. Preferably the modulator 50 is integrated with oscillator 34. In FIG. 5 such integration of the modulator 50 and oscillator 34 is represented by the broken line 55 encircling the symbols representing these two components. One of the ways of effecting frequency control in a voltage controlled oscillator involves using the voltage control signal of the oscillator to regulate, by means of its DC bias, the capacitance of a varactor which forms part of the resonant circuit of that oscillator. It may be noted that the capacitance presented by the electro-absorption modulator diode 50 is similarly voltage dependent, and hence the circuit of FIG. 5 may be modified so that when the modulator 50 forms part of the resonant circuit of the oscillator 34 the voltage control signal on line 33 is developed across the modulator diode itself, thereby obviating the need for any other variable reactance element in the resonant circuit of the oscillator.

Figure 7:
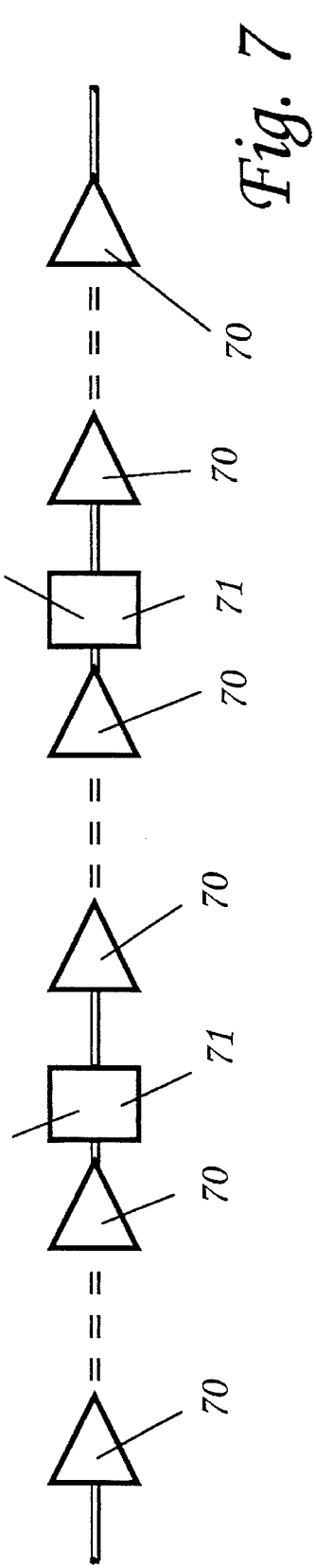
FIG. 7 is a diagram of a transmission system incorporating a plurality of the circuits of FIG. 3.

Previous reference has been made to the possible use of the pulse retiming and reshaping circuits of the present invention at intervals along an optical transmission path with concatenated optical amplifiers. FIG. 7 schematically depicts such a transmission path having optical amplifiers 70, and with pulse retiming and reshaping circuits 71 at the locations of selected ones of the amplifiers 70.

I claim:

1. An optical pulse retiming and reshaping circuit including a phase-locked loop comprising;

an optical modulator having an optical input, an optical output, and having a modulation control input;

an electrical oscillator having a phase/frequency control signal input, and an output connected to the modulation control input of the modulator;

means optically coupled with the modulator, which means is provided with an electrical output at which is generated by said means an electrical signal which is a measure of the mean optical power transmitted by, or intercepted by, the modulator; and a phase order indicating device having an input connected to the output of said means, and an output connected to the phase/frequency control signal input of the oscillator.

2. An optical pulse retiming and reshaping circuit as claimed in claim 1, wherein said means providing a measure of the mean optical power transmitted by, or intercepted by, the modulator is a photodetector.

3. An optical pulse retiming and reshaping circuit as claimed in claim 1, wherein the modulator and the oscillator are integrated.

4. An optical pulse retiming and reshaping circuit as claimed in claim 1, wherein the modulator is a Mach-Zehnder modulator having a pair of 3 dB couplers connected optically in series to define two limbs of the Mach-Zehnder, at least one of which incorporates a variable retardation element.

5. An optical pulse retiming and reshaping circuit as claimed in claim 1, wherein the modulator is an electro-absorption modulator.

6. A pulsed optical data stream transmission system with concatenated optical amplifiers, which system includes an optical pulse retiming and reshaping circuit as claimed in claim 1 at at least one location along the length of said system.

7. A pulsed optical data stream transmission system with concatenated optical amplifiers, which system includes an optical pulse retiming and reshaping circuit as claimed in claim 1 at the location of each one of said amplifiers.

8. An optical pulse retiming and reshaping circuit as claimed in claim 1, wherein the phase order indicating device is adapted to impress a low frequency modulation upon the output frequency of the oscillator.

9. A pulsed optical data stream transmission system with concatenated optical amplifiers, which system includes an optical pulse retiming and reshaping circuit as claimed in claim 8 at at least one location along the length of said system.

10. A pulsed optical data stream transmission system with concatenated optical amplifiers, which system includes an optical pulse retiming and reshaping circuit as claimed in claim 8 at the location of each one of said amplifiers.

11. An optical pulse retiming and reshaping circuit including a phase-locked loop comprising;

a combined optical modulator and electrical resonant circuit containing oscillator, combined such that the modulator exhibits a self-capacitance that forms a part of the resonant circuit of the electrical oscillator, the optical modulator having an optical input, an optical output, and having a modulation control input; the electrical oscillator having a phase/frequency control signal input, and an output connected to the modulation control input of the modulator;

means optically coupled with the modulator, which means is provided with an electrical output at which is generated by said means an electrical signal which is a measure of the mean optical power transmitted by, or intercepted by, the modulator; and a phase order indicating device having an input connected to the output of said means, and an output connected to the phase/frequency control signal input of the oscillator.

12. An optical pulse retiming and reshaping circuit as claimed in claim 11, wherein said means providing a measure of the mean optical power transmitted by, or intercepted by, the modulator is a photodetector.

13. An optical pulse retiming and reshaping circuit as claimed in claim 11, wherein the modulator and the oscillator are integrated.

14. An optical pulse retiming and reshaping circuit as claimed in claim 11, wherein the modulator is a Mach-Zehnder modulator having a pair of 3 dB couplers connected optically in series to define two limbs of the Mach-Zehnder, at least one of which incorporates a variable retardation element.

15. An optical pulse retiming and reshaping circuit as claimed in claim 11, wherein the modulator is an electro-absorption modulator.

16. A pulsed optical data stream transmission system with concatenated optical amplifiers, which system includes an optical pulse retiming and reshaping circuit as claimed in claim 11 at at least one location along the length of said system.

17. A pulsed optical data stream transmission system with concatenated optical amplifiers, which system includes an optical pulse retiming and reshaping circuit as claimed in claim 11 at the location of each one of said amplifiers.

18. An optical pulse retiming and reshaping circuit as claimed in claim 11, wherein the phase order indicating device is adapted to impress a low frequency modulation upon the output frequency of the oscillator.

19. A pulsed optical data stream transmission system with concatenated optical amplifiers, which system includes an optical pulse retiming and reshaping circuit as claimed in claim 18 at at least one location along the length of said system.

20. A pulsed optical data stream transmission system with concatenated optical amplifiers, which system includes an optical pulse retiming and reshaping circuit as claimed in claim 18 at the location of each one of said amplifiers.

* * * * *